United States Patent [19]
Hill

[11] 3,858,103
[45] Dec. 31, 1974

[54] BATTERY CHARGING SYSTEMS

[75] Inventor: William Frank Hill, Stafford, England

[73] Assignee: The Lucas Electrical Company Limited, Birmingham, England

[22] Filed: Sept. 5, 1973

[21] Appl. No.: 394,480

[30] Foreign Application Priority Data
May 9, 1972 Great Britain .................. 41065/72

[52] U.S. Cl. .................. 320/64, 320/68, 322/28, 322/59
[51] Int. Cl. .................. H02j 7/16
[58] Field of Search .......... 320/64, 65, 68; 322/28, 322/59, 69, 70

[56] References Cited
UNITED STATES PATENTS
1,241,310  9/1917  Vidal .................. 320/65
3,036,261  5/1962  Grady, Jr. .................. 320/69 X FOREIGN PATENTS OR APPLICATIONS
1,019,007  2/1966  Great Britain Primary Examiner—J. D. Miller
Assistant Examiner—Robert J. Hickey
Attorney, Agent, or Firm—Holman & Stern

[57] ABSTRACT

A battery charging system for a road vehicle has a wound field alternator charging the battery through a full wave rectifier, and a voltage regulator controlling the current flow in the field winding of the alternator. The field winding is connected in the circuit so that in the event of a fault, the energy in the field winding is dissipated rapidly.

1 Claim, 2 Drawing Figures

BATTERY CHARGING SYSTEMS

This invention relates to battery charging systems, particularly for road vehicles.

A battery charging system according to the invention includes a wound field alternator charging the battery through a full wave rectifier, and a voltage regulator controlling the current flow in the field winding of the alternator, the field winding being connected in the circuit so that when the current supply to the field winding is interrupted, the energy stored in the field winding causes the field current to flow to charge the battery.

Figure 1:
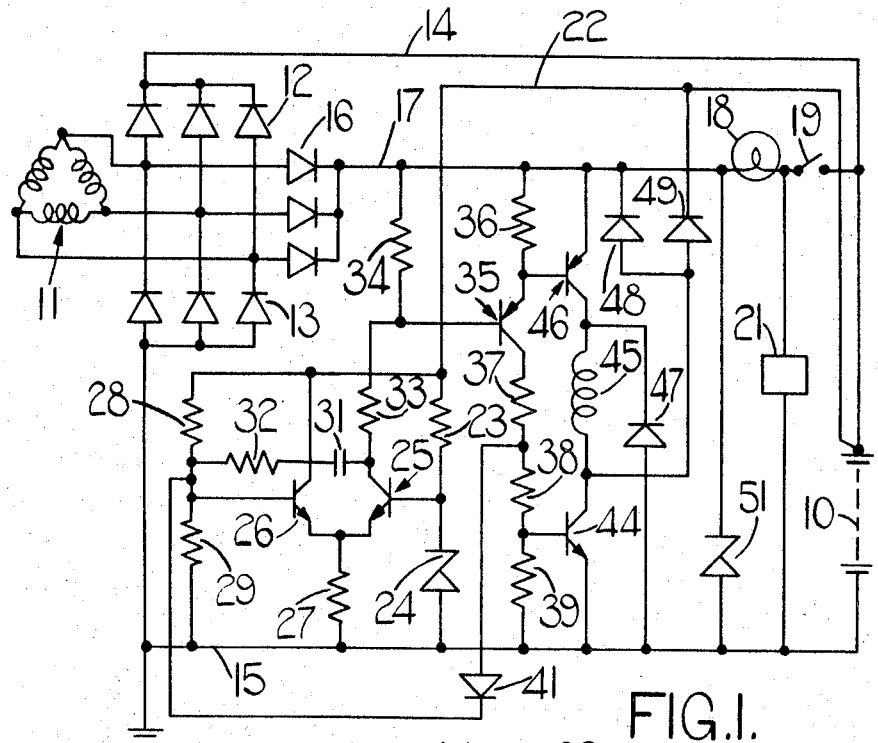
Figure 2:
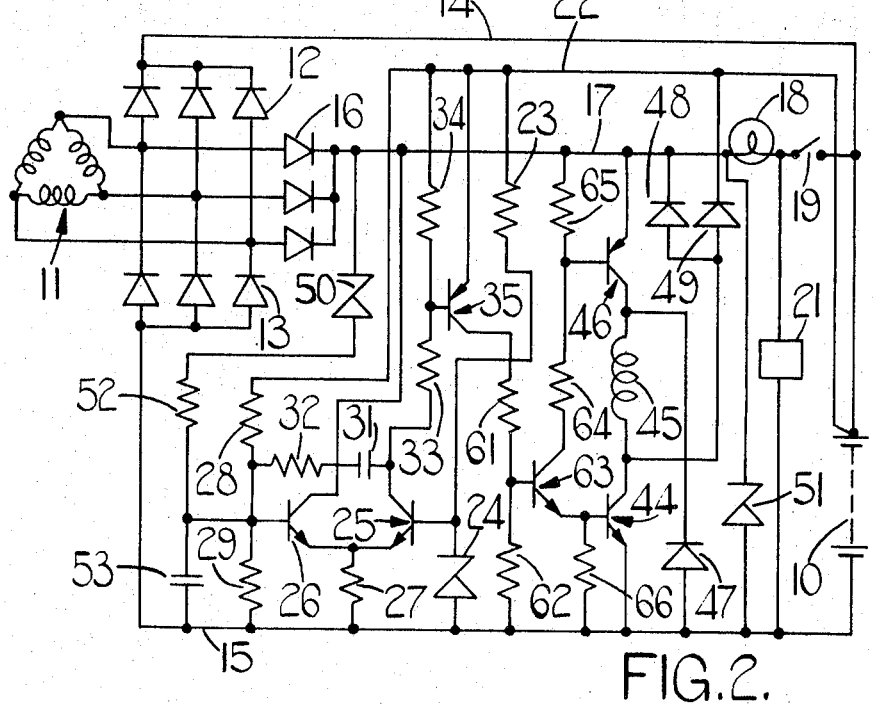

In the accompanying drawings, FIGS. 1 and 2 are circuit diagrams illustrating two examples of the invention.

Referring to FIG. 1, there is provided a three phase alternator having a stator 11 which provides an output by way of diodes 12, 13 respectively to positive and negative supply lines 14, 15 between which the battery 10 of a road vehicle is connected. The line 15 is earthed. The alternator stator 11 provides a further output through three additional diodes 16 to a positive supply line 17 which is connected to the line 14 through an ignition warning lamp 18 and the vehicle ignition switch 19 in series, the switch 19 being connected across the battery 16 in connection with the ignition controlled loads 21 of the vehicle.

Connected to the positive terminal of the battery 10 is a battery sensing lead 22 which is connected to the line 15 through a resistor 23 in a Zener diode 24 in series. The junction of the resistor 23 and Zener diode 24 is connected to the base of an n-p-n transistor 25 which together with a further n-p-n transistor 26 forms a long tailed pair, the emitters of the transistors 25, 26 being connected through a common resistor 27 to the line 15. The transistor 26 has its collector connected to the lead 22 and its base connected to the junction of a pair of resistors 28, 29 connected in series between the lead 22 and the line 15. The collector of the transistor 25 is connected to the base of the transistor 26 through a capacitor 31 and a resistor 32 in series, and is further connected through a resistor 33 and a resistor 34 in series to the line 17. The junction of the resistors 33, 34 is connected to the base of a p-n-p transistor 35 having its emitter connected through a resistor 36 to the line 17 and its collector connected to the line 15 through three resistors 37, 38, 39 in series. The junction of the resistors 37, 38 is connected through a diode 41 to the base of the transistor 26, whilst the junction of the resistors 38, 39 is connected to the base of an n-p-n transistor 44, the emitter of which is connected to the line 15 and the collector of which is connected through the field winding 45 of the alternator to the collector of a p-n-p transistor 46, the transistor 46 having its emitter connected to the line 17 and its base connected to the emitter of the transistor 35. The collector of the transistor 46 is connected to the line 15 through a diode 47, and the collector of the transistor 44 is connected through a diode 48 to the line 17 and through a diode 49 to the line 14. Finally, a Zener diode 51 is connected between the lines 17, 15.

When the ignition switch 19 is closed, current flows to the loads 21, and there is also a current flow by way of the lamp 18, the resistor 34, the resistor 33 and the transistor 25 and resistor 27 to the line 15. The transistor 25 is held conductive by current flowing from the lead 22 through the resistor 23. Conduction of the transistor 25 turns on the transistors 35, 46, and conduction of the transistor 35 turns on the transistor 44, so that current flows in the field winding 45. The lamp 18 is illuminated at this stage. When the alternator produces an output, the potential on the line 17 becomes approximately equal to the potential on the line 14 so that the voltage regulator is fed by the lines 17, 15, and the lamp 18 is extinguished.

As the battery voltage increases, the transistor 26 conducts increasingly and so the transistor 25 conducts less. When the battery voltage reaches a predetermined value, the transistor 26 conducts sufficiently for the transistor 25 to become unsaturated, and thereafter the long tailed pair 25, 26 oscillates by virtue of the feedback circuit through the capacitor 31 and the resistor 32 with a mark-space ratio determined by the battery voltage. With the transistor 25 on, the transistors 44 and 46 are on as previously explained, but with the transistor 26 on, then of course the transistors 44 and 46 are off. The mean current flow in the winding 45 is regulated in this way to maintain the battery voltage substantially constant.

When the transistors 44, 46 turn off, current flows from the lower end of the winding 45 by way of the diode 49, the battery 10 and the diode 47 to the upper side of the winding 45, so maintaining current flow through the winding 45 and charging the battery.

In the event of a fault in the system causing the potential between the lines 17, 15 to rise, then the Zener diode 51 breaks down and conducts. The most likely fault is disconnection of the battery 10, and with the battery 10 disconnected, the energy stored in the winding 45 is dissipated by way of the diode 48 and the Zener diode 51, or alternatively by way of loads connected across the battery 10. In either case, the increased voltage present to the field winding 45 accelerates the collapse of excitation, thereby reducing the duration of the over-voltage condition. This feature prevents damage to load equipment which would otherwise result, e.g. in cases where a simple freewheel diode is used across the field winding.

The diode 41 prevents damage if the lead 14 becomes broken. Moreover, it will be appreciated that if the lead 22 should break or become disconnected, then the alternator will cease to operate, and the warning lamp 18 will be illuminated.

Referring now to FIG. 2, some of the components are the same as in FIG. 1, and have been designated with the same reference numerals. It will be noted that a further Zener diode 50 is now connected across the lines 17, 15 in series with a resistor 52 and a capacitor 53, the junction of the resistor 52 and capacitor 53 being connected to the base of the transistor 26. Moreover, the collector of the transistor 26 is connected to the line 17, rather than the line 22, and the resistors 34 is returned to the line 22 rather than the line 17. The resistors 36, 37, 38 and 39 are omitted, as is the diode 41. The emitter of the transistor 35 is not connected to the base of the transistor 46 as in FIG. 1, but is connected to the line 22. The collector of the transistor 35 is connected through resistors 61, 62 in series to the line 15, the junction of the resistors 61 and 62 being connected to the base of an n-p-n transistor 63 having its collector connected to the line 17 through resistors 64, 65 in series, the junction of the resistors 64, 65 being connected to the base of the transistor 46. The emitter of the transistor 63 is connected through a resistor 66 to the line 15 and is also connected to the base of the transistor 44.

The basic operation of the circuit is the same as in FIG. 1. In FIG. 1, the transistor 25 serves when it is conductive to turn on the transistors 35, 44 and 46, and similarly in FIG. 2, the transistor 25 turns on the transistor 35, which turns on the transistor 63, which in turn turns on the transistors 44 and 46. When the transistor 26 turns on sufficiently, the transistors 25, 35, 63, 44 and 46 will all be off.

If the lead 22 breaks or becomes disconnected, the supply to the base of the transistor 63 is broken, and so the field winding cannot be energised, and the field current drops to zero.

If the lead 14 becomes broken or disconnected, then the Zener diode 51 will conduct as in FIG. 1, and in FIG. 2 the Zener diode 50 will turn on the transistor 26, so that it has the same effect as the diode 41 in FIG. 1. In both examples, the Zener diode 51 has to dissipate less power than in a conventional arrangement.

I claim:

1. A battery charging system comprising in combination a wound field alternator providing power by way of a full wave rectifier to positive and negative supply lines between which the battery is connected, one or more additional diodes coupling the alternator output to a third supply line which when the alternator produces an output is at substantially the same potential at the first line, a warning lamp and ignition switch connected in series between the third and first lines, a pair of switching devices coupling opposite ends of the field winding of the alternator to the third and second lines, said switching devices forming part of a voltage regulator for connecting and disconnecting the field winding from the third and first supply lines in accordance with the output voltage of the alternator to regulate the output voltage of the alternator, a first diode having its cathode connected to the junction of the field winding of the first switching device and its anode connected to the second line, and second and third diodes having their anodes connected to the junction of the field winding and the second switching device, the cathode of the second diode being connected to the third line and the cathode of the third diode being connected to the first line.

* * * * *